Aug. 6, 1963  E. H. SMITH  3,099,993
METHOD OF INCREASING THE EFFICIENCY OF FLUID FLOW
Filed July 22, 1960  2 Sheets-Sheet 1

INVENTOR.
EDWARD H. SMITH
BY *Shapiro and Shapiro*
ATTORNEYS

Aug. 6, 1963  E. H. SMITH  3,099,993
METHOD OF INCREASING THE EFFICIENCY OF FLUID FLOW
Filed July 22, 1960  2 Sheets-Sheet 2

INVENTOR.
EDWARD H. SMITH
BY *Shapiro and Shapiro*
ATTORNEYS

United States Patent Office 3,099,993
Patented Aug. 6, 1963

3,099,993
METHOD OF INCREASING THE EFFICIENCY
OF FLUID FLOW
Edward H. Smith, Silver Spring, Md., assignor of fifty percent to Gordon B. Hanson
Filed July 22, 1960, Ser. No. 44,641
7 Claims. (Cl. 137—13)

This invention relates to increasing the efficiency of fluid flow, and more particularly to the creation of forces at a fluid-solid interface which oppose the frictional forces existing at the interface during fluid flow, so as to assist in the propulsion of the fluid.

When a fluid moves relative to some physical boundary, such as a flow conductor or pipe line, forces exist at the boundary which tend to impede the movement of the fluid relative to the boundary. The flow may be laminar or turbulent in different degrees, depending upon the rate of flow, the properties of the flowing material, and the geometric configuration of the flow boundaries. When the flow is turbulent, the forces tending to retard the flow are much greater than in the case of laminar flow, and hence more energy is consumed in propelling the fluid at a given flow rate. If fluid is flowing at a given rate in a turbulent condition and the flow can be made laminar, less energy will be required to produce the same flow rate, or a greater flow rate can be obtained with consumption of the same energy.

It is accordingly a primary object of the present invention to provide apparatus for and a method of increasing the efficiency of fluid flow.

Another primary object of the invention is to create forces at the boundary of a flowing fluid which oppose the existing frictional forces at the boundary during flow.

Yet another object of the invention is to create forces at the boundary of a flowing fluid which promote the propulsion of the fluid relative to the boundary.

Still another object of the invention is to provide an apparatus for and a method of altering in a controlled way the conditions at the interface between a solid and a fluid which is flowing with respect thereto, so as to reduce or totally eliminate flow turbulence.

A more specific object of the invention is to provide unique vibratory boundaries for fluid flow.

An additional specific object of the invention is to provide improved fluid flow conductors or pipe lines.

Yet another object of the invention is to provide a unique apparatus for and method of producing beneficial vibrations adjacent the wall of a flow conductor.

Stated generally, and without limitation, the present invention is concerned with the creation of forces at the boundary of a flowing fluid which oppose the existing forces at the boundary tending to retard the fluid flow, the forces created being due to acceleration of the fluid at the boundary, as by vibration of the boundary in a predetermined manner.

The foregoing, and other objects, advantages, and features of the invention, and the manner in which the same may be accomplished will become more readily apparent upon consideration of the following detailed description of the invention taken in conjunction with the accompanying drawings, which illustrate exemplary forms of the invention, and wherein.

A basic discovery upon which the present invention is predicated is that fluid flow efficiency may be enhanced by the establishment adjacent a flow boundary of accelerations in the fluid which produce forces in opposition to and even surpassing the frictional, flow-retarding forces which exist at the boundary during fluid flow. The applicant has discovered that the desired forces may be created by vibration of the solid boundary in a predetermined controlled manner.

Figure 1:
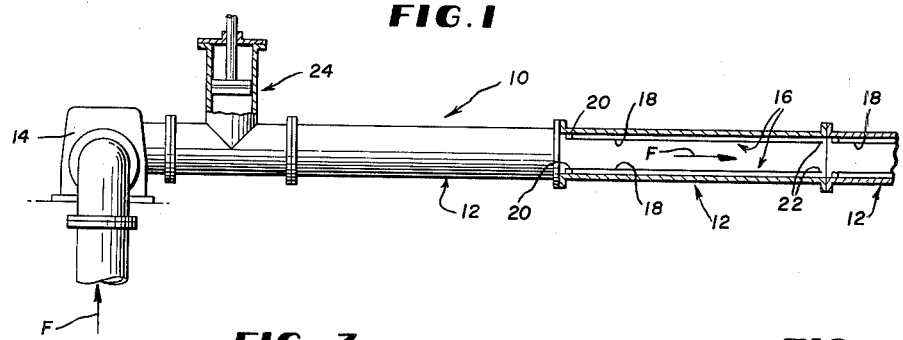
FIGURE 1 is a somewhat diagrammatic view of a pipe line constructed in accordance with concepts of the invention.

Referring to the drawings, FIGURE 1 illustrates one embodiment of the invention in its application to a flow conductor or pipe line generally designated 10. For constructional convenience the pipe line may be formed in successive sections 12 joined by conventional joints, such as the flanges illustrated. Typically, the pipe line may be constructed from metal or other suitable material, such as concrete. Fluid flows in the direction of the arrows F from some source (not shown), such as a liquid petroleum reservoir, the fluid being propelled by a conventional pump 14, which may be of the centrifugal type, for example.

The fluid flow within the pipe line 10 may be turbulent or laminar, depending upon the flow rate and other factors previously mentioned, but in either case there will be frictional forces existing at the pipe wall boundary which tend to retard the fluid flow. In accordance with the invention such forces are opposed by other forces created at the flow boundary. In the illustrative form of FIGURE 1 the latter forces are created by apparatus including a liner generally designated 16, formed of a suitable material, such as metal. The liner is formed in sections 18 which are representative of sections to be described in more detail hereinafter. The sections are mounted on the pipe wall by supports 20 at their upstream ends, the downstream ends 22 being relatively free. The sections are spaced from the pipe wall to permit them to vibrate. As will become more fully apparent, the vibrations may be forced (i.e., the liner sections may be directly driven) or induced (i.e., the vibrations may be indirectly excited). FIGURE 1 illustrates an arrangement of the latter type, vibrations of the liner sections being induced by pulsations in the fluid. For this purpose a pulsator 24 is coupled to the pipe line, the pulsator being shown in the illustrative form as a simple reciprocating piston pump, which preferably is capable of producing pressure pulsations of adjustable magnitude and repetition rate, as by control of the stroke and operating frequency of the piston.

When the system of FIGURE 1 is in operation, the pulsations produced by the pulsator 24 are transmitted to the liner 16 by the fluid flowing through the pipe line, causing the liner to vibrate. As will be more fully described hereinafter, vibration of the liner creates the desired forces which oppose the flow-retarding forces at the flow boundary. The result is that for a given power consumption by the pump 14 the flow rate is substantially increased, or for the same flow rate, the power consumption is substantially decreased. More specifically, the forces created at the flow boundary may be established so as to transform an existing condition of turbulent flow to a laminar flow condition, thereby permitting the consumption of substantially less power in driving the pump 14, or a greater rate of flow may be obtained for the same power consumption, with the establishment of a new "equilibrium" at which the flow may again be turbulent.

Figures 3, 4:
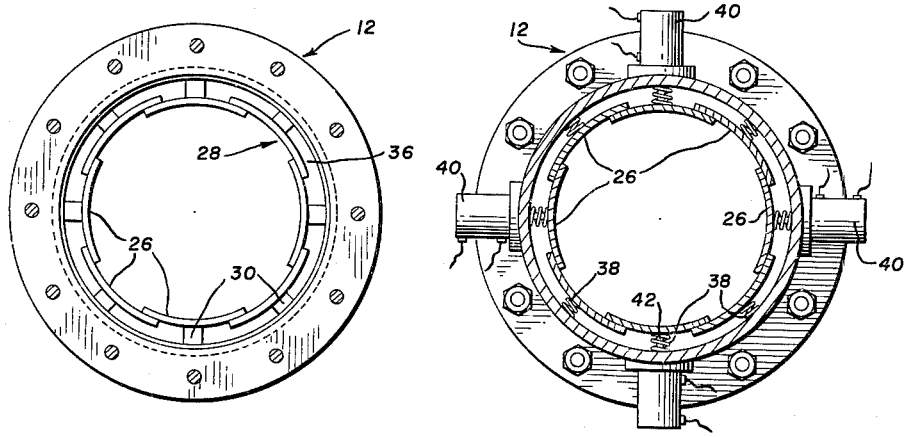
FIGURE 3 is a sectional view taken along line 3—3 of FIGURE 2.
FIGURE 4 is a sectional view taken along line 4—4 of FIGURE 2.
Figure 2:
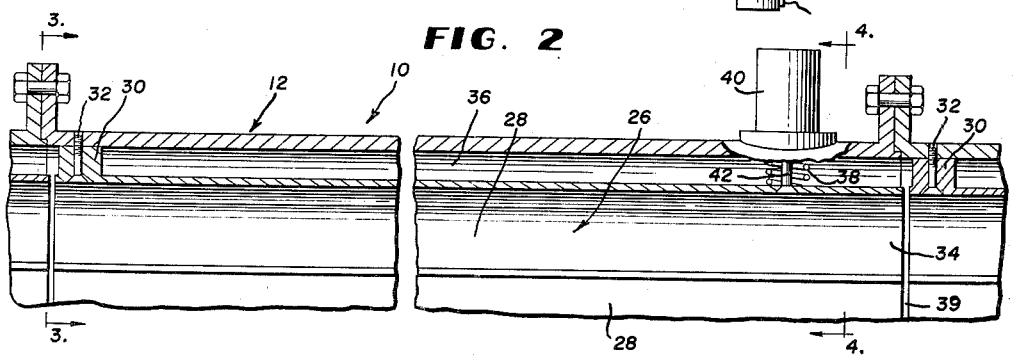
FIGURE 2 is a fragmentary longitudinal sectional view of a flow conductor or pipe line constructed in accordance with one form of the invention.

FIGURE 2 illustrates in greater detail an embodiment of the invention in which a flow conductor 10 comprising sections 12 has a liner 26 constituted by sections 28. The sections are elongated strips, which are arcuate as seen transversely in FIGURES 3 and 4. The assembly of strips makes a substantially cylindrical liner in close proximity to the wall of the conductor 10. Each strip 28 is supported on the pipe wall at the upstream end of the strip, as by an arcuate flange 30 which may be attached to the wall as by machine screws 32, for example. The downstream end 34 of each strip is relatively free, and the strips are made of flexible, somewhat elastic material so that they may vibrate generally radially of the pipe line. The space 36 between the strips and the pipe wall is made sufficient to accommodate the vibratory movement of the strips, but the strips are placed close enough to the wall so that the pipe diameter is not substantially reduced. For better control of the vibratory movement of the strips, each may be provided with a coil spring 38 between its downstream end and the adjacent wall of the pipe line. In the illustrative form the side extremities of the strips are overlapped as shown in FIGURES 3 and 4, alternate strips being slightly inward (or outward) of the intermediate strips. It is preferred that there be fluid on both sides of the liner strips, so the adjacent ends of successive strips may be spaced as shown at 39. (In some instances the ends may overlap.) Alternatively, or in addition, passages may be provided through the mounting flanges 30.

In the form shown the strips are directly driven, solenoids 40 being provided for this purpose, although indirect drive as in FIGURE 1 could be employed. Each solenoid may be mounted in water-tight fashion on the wall of the pipe, outwardly of a liner strip, and may have its armature shaft 42 extending through a bushing in the pipe wall to the associated strip. The armature shafts may pass through the associated springs 38 as shown. In view of the illustrated overlapping relationship of the liner strips, solenoids may be provided for alternate strips only, because if the solenoids are energized in phase, each pair of solenoids will move the intermediate strips outwardly by virtue of the contact of the side portions of these strips with the strips attached to the armature shafts. When the solenoids are de-energized, the strips will move inwardly by virtue of their inherent resiliency and the return bias exerted by the springs. It will therefore be apparent that if the solenoids are energized and de-energized repetitively, the liner strips will be placed in oscillation, maximum oscillatory efficiency being obtained by matching the repetition rate of the energization of the solenoids to the natural vibratory frequency of the strip and spring assemblies.

The direct drive system of FIGURES 2–4, represented by the solenoid assemblies, is merely typical of the many types of direct drive which might be employed. Mechanical (cams, linkages, etc.), electrical, electromechanical, or electronic drive systems may be utilized where convenient. Regardless of the type of drive employed, the ultimate result desired is the same, namely, the vibration of the liner in such a way as to create forces which oppose the flow-retarding forces normally present at the fluid boundary.

Figure 5:
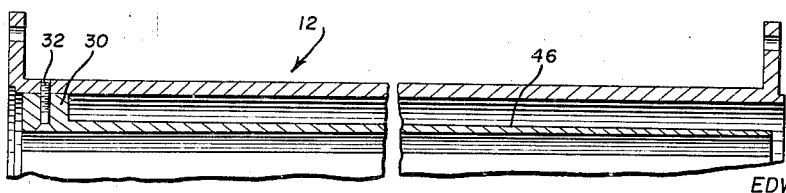
FIGURE 5 is a fragmentary longitudinal sectional view illustrating a modified embodiment of the invention.

FIGURE 5 illustrates a modified embodiment of the invention, as represented by a pipe line section 12 having flexible liner sections such as the section 46 illustrated. The liner sections may have mounting flanges as in FIGURE 2. As can be seen, the liner sections are tapered, being smaller at the downstream end, and are entirely free at the downstream end. This embodiment illustrates that the desired vibrations may be optimized by appropriately contouring the liner sections.

Figure 7:
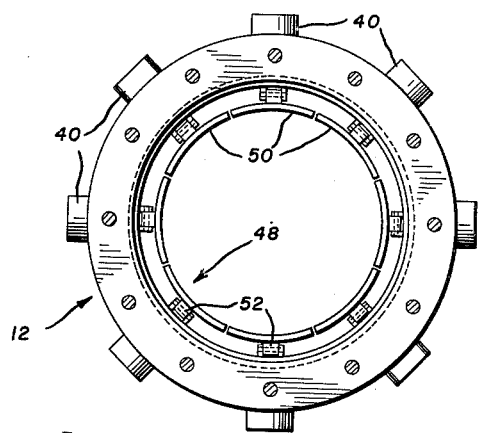
FIGURE 7 is a sectional view taken along line 7—7 of FIGURE 6.
Figure 6:
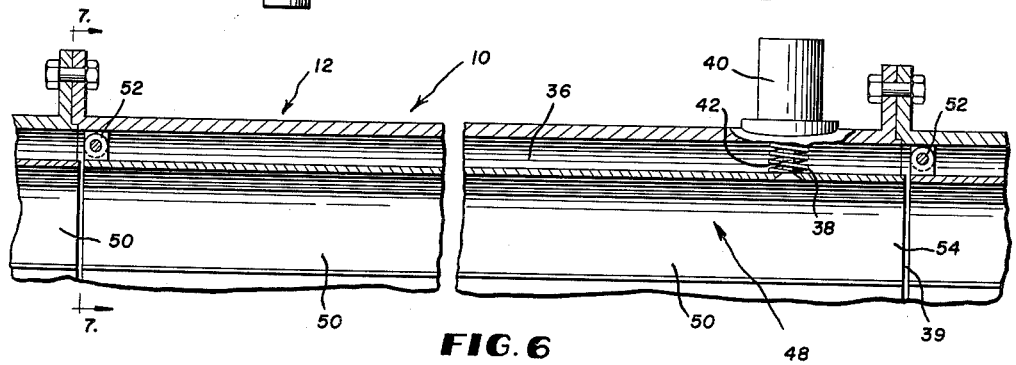
FIGURE 6 is a fragmentary longitudinal sectional view illustrating another modification of the invention.

FIGURE 6 illustrates another form of the invention, in which the sections 12 of the flow conductor 10 have a liner 48 comprising substantially rigid sections 50. Each section is an arcuate elongated strip, generally similar in shape to the strips of FIGURE 2, but of rigid, rather than flexible material. Each strip is mounted at its upstream end on a pivot 52 on the pipe wall, the downstream end 54 being relatively free, whereby each strip may oscillate about its upstream end. Springs 38 are again provided at the downstream ends, the natural period of vibration of the strips being a function of the spring parameters. Here again the strips may be directly driven, as by solenoids 40 having their armature shafts 42 attached to the strips, but the drive means is merely illustrative, and this embodiment of the invention, as well as the others, may employ other direct drive means or indirect drive means as previously described. In the illustrative form the sides of the strips are not overlapped, but are spaced slightly as shown in FIGURE 7 to accommodate the inward movement of the strips. Each strip is provided with its own solenoid 40. Repetitive energization and de-energization of the solenoids, preferably in phase, produces vibrations in the liner which increase the flow efficiency as before mentioned.

Figure 8:
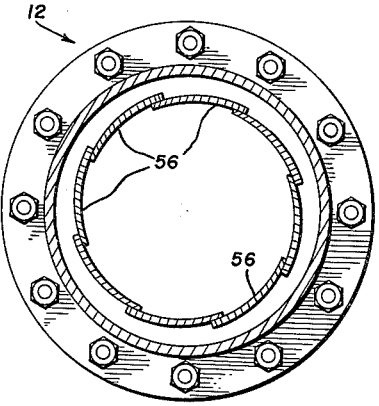
FIGURE 8 is a sectional view illustrating another modification of the invention.

FIGURE 8 illustrates a modified arrangement, in which the liner strips 58 are overlapped, but differently from the scheme employed in FIGURES 3 and 4. The strips may be of the type shown in FIGURES 2, 5, or 6, for example. It will be apparent at this point that various features of the different described embodiments may be interchanged where desired and where feasible.

Figure 9:
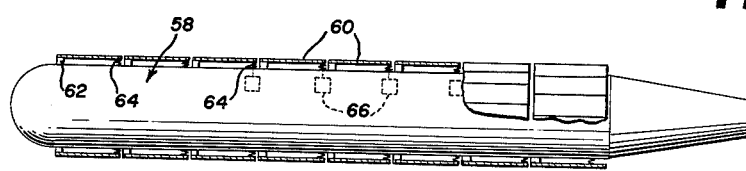
FIGURE 9 is a somewhat diagrammatic view illustrating the application of certain concepts of the invention to another type of fluid-solid interface.

Although the invention is primarily concerned with the flow of fluids through flow conductors, such as pipe lines, within its broader aspects the invention has applicability to the movement of solid bodies through fluids. Thus, FIGURE 9 illustrates the application of the invention to a hull, which may be the shell of a torpedo 58. Since most of the drag on the torpedo exists at the elongated sides thereof, the invention has been shown as applied to those portions, but in a more refined form, the remaining portions of the torpedo could be similarly treated. The boundary between fluid and solid has been provided with a series of vibratory plates 60, which are supported at their forward ends by supports 62 on the outer surface of the torpedo and which are relatively free at their rearward ends. Springs 64 may be provided between the rearward ends and the hull for better control of the vibrations of the plates. The plates may be similar to those shown in FIGURES 2, 5, or 6, for example. The plates may be placed in oscillation by solenoids 66 within the torpedo body, for example, the construction shown being representative.

Figure 10:
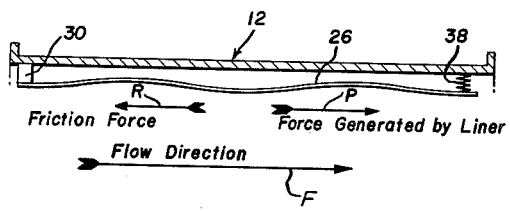
FIGURE 10 is an explanatory diagram.

The foregoing description sets forth several different implementations of the concepts of the invention, especially with respect to the creation of beneficial, drag-reducing, propulsive forces in the region of the flow boundary. While the invention is of course not limited to a particular theory of operation, the manner in which the invention is believed to function will now be demonstrated. FIGURE 10 illustrates the action of a typical flexible liner strip, the type shown in FIGURE 2 for example. The fluid flow direction is indicated by the arrow F. A flow-retarding frictional force represented by the arrow R is exerted by the flow boundary (in this case the liner) upon the fluid. Since this force is in the upstream direction it tends to impede the fluid flow. When the liner vibrates, as illustrated by the sinuous configuration of the strip 26, a force is created due to the acceleration of the fluid in the vicinity of the boundary, and this force is exerted on the fluid in the downstream direction, as indicated by the arrow P. It will be observed that the force P is in opposition to the retarding force R and thus tends to propel the fluid in the desired direction. It has been found, indeed, that the force P can be made of such magnitude as to surpass the magnitude of the force R, which results in a net propulsive force at the fluid boundary. In the case of the flexible liner strip in which vibrations are induced, it is believed that the pulsations in the fluid create a travelling wave which moves from the upstream to the downstream end of the strip and which results in the desired force P. With respect to a rigid liner strip, the magnitude of the force P generated by a flat rigid strip of low aspect ratio vibrating about one end can be shown mathematically to be $$P = \frac{\pi^3 \rho_f v^2 l^2 \alpha^2}{4} w^2$$

where "$\rho_f$" is the fluid density, "$v$" is the frequency of vibration, "$l$" is the length of the strip, "$\alpha$" is the angular displacement of the free end on each side of the mean position, and "$w$" is the width of the strip.

While it is now apparent that the creation of the force P substantially increases the efficiency of fluid flow, it has also been discovered that vibration or oscillation of the liner can be made to reduce or completely eliminate flow turbulence. One standpoint from which the reduction or elimination of turbulence may be viewed is that of pressure gradient in the flow conductor, which is related to the states of laminar and turbulent flow. If the conditions at the flow boundary are properly controlled, the pressure gradient may be adjusted to provide the desired type of flow. For example, with fluid flowing through a pipe line in the conventional manner there is a normal pressure gradient which is negative. The vibration of the liner may be looked upon as making the pressure gradient less negative or even positive at certain regions within the flow conductor, the pressure gradient being varied by the oscillatory movement of the liner, which tends to vary repetitively the cross-sectional area of the flow conductor. The change in pressure gradient is a function of the frequency of the liner vibration, the amplitude of the vibration, and the density of the fluid. Since the vibration of the liner is a cyclic phenomenon, at one instant of time the pressure gradient at a region within the conductor may be such as to produce a turbulent flow, and at another instant of time may be such as to produce a laminar flow. However, a fluid which is in a laminar state requires a certain minimum time to change to a turbulent state, and if the repetition rate of the liner vibrations is sufficiently high, there is insufficient time between those parts of the liner vibration cycle in which laminar flow occurs to permit a change to turbulent flow. Thus, if the prevention of turbulence is the result desired, the lower limit of the frequency of vibration of the liner is determined by the time required for the fluid to change from laminar to turbulent flow. The upper frequency limit is determined by the ability of the fluid to respond to or follow the movement of the liner.

The amplitude of the liner vibration is a function of the strip configuration, the amplitude of the driving force, and the density of the fluid. The amplitude should be great enough to produce an appreciable effect upon the flow efficiency, but not so great as to decrease substantially the effective cross-sectional area of the flow conductor.

The manner in which a vibrating liner may be employed to eliminate turbulence may be demonstrated mathematically. Assume a pipe having an elastic liner supported in close proximity to its inner wall on rigid supports spaced a distance "$l$" apart in the direction "$z$" along the length of the pipe, the radial direction being designated "$r$." The liner is free to vibrate under the pressure forces of the flowing fluid according to the equation (1) $$\frac{\partial^{(4)} Y}{\partial z^4} + \frac{3\rho(1-s^2)}{Qh^4} \frac{\partial^2 Y}{\partial t^2} = p(t, a)$$

where Y is the instantaneous displacement of the liner about its mean position $r=a$, $\rho$ equals the density of the liner material, $s$ = Poisson's ratio, $Q$ = Young's modulus, "$h$" equals the half thickness of the liner, and $p(t, a)$ is the excess pressure at $r=a$. When the liner is vibrating in its fundamental mode, the displacement Y will be of the form (2) $$Y = A \sin\left(\frac{\pi}{l} z\right) \cos \omega t$$

where (3) $$\omega = 2\pi v = \left(\frac{\pi h}{l}\right)^2 \sqrt{\frac{Q}{3\rho(1-s^2)}}$$

and $v$ is the fundamental frequency.

Now the fluid in the pipe will flow with some mean speed $v_0$ with a superimposed time-dependent flow which is governed by the amplitude and frequency of the wall vibration. Looking at the superimposed flow due to wall vibration and appealing to the theory of perfect fluids, which is adequate to support the scientific principle involved, the superimposed flow will have a velocity potential $\psi$ of the form (4) $$\psi(r, t, z) = B I_0(kr) \sin \frac{\pi}{l} z \sin \omega t$$

where $k = \pi/l$ and $I_0$ is the zero order Bessel function as defined in "Bessel Functions," by Watson, page 77.

The condition at the wall for the superimposed flow is (5) $$-\left.\frac{\partial \psi}{\partial r}\right|_{r=a} = \frac{\partial Y}{\partial t}$$

Using (5), it is found that $$-B k I_1(ka) = -\omega A$$

or $$B = \frac{\omega A}{k I_1(ka)}$$

where $I_1$ is the first order Bessel function. Consider now the fluid speed tangential to the vibrating wall. The case of interest is the one where $A \ll l$. In other words, the vibrational amplitude is small compared to a half wavelength. For this case, the tangential, i.e. axial flow speed, is (6) $$v_t = -\frac{\partial \psi}{\partial z} = -\frac{B\pi}{l} I_0(kr) \cos\left(\frac{\pi}{l} z\right) \sin \omega t$$

At the wall, $r=a$, this becomes, with $$B = \frac{\omega A}{k I_1(ka)}$$

(7) $$v_t = \frac{-\omega A \pi}{k l I_1(ka)} I_0(ka) \cos\left(\frac{\pi}{l} z\right) \sin \omega t$$

Thus, $v_t$ oscillates from positive to negative values as a function of the time "$t$." Hence, if $v_t$ can be made of the order $v_0$ and opposite in sign to $v_0$ at some time "$t$," the conditions for a laminar layer at the boundary will be established. Further, if $v$ is high enough, there will not be time to re-establish a turbulent regime in the time of one wall vibration.

To be specific, consider the times "$t$" given by $$\omega t = 2\pi n + \pi/2$$

At these values of "$t$"

$$v_t = \frac{-A\omega\pi}{l} \frac{I_0(ka)}{k I_1(ka)} \cos \frac{\pi}{l} z$$

It is required, therefore, that $$(8) \quad \left|\frac{A\omega\pi}{l}\frac{I_0(ka)}{kI_1(ka)}\cos\frac{\pi}{l}z\right| \simeq v_0$$

over a substantial range of "z," and that $\omega$ be sufficiently large so that turbulence cannot be re-established in time $$\tau = \frac{2\pi}{\omega}$$

Referring to "Modern Developments in Fluid Mechanics," edited by S. Goldstein, Oxford, 1938, page 183, the time for turbulent flow to be established is given by $$(9) \quad T = \frac{.702}{\left|\frac{\partial v_t}{\partial r}\right|_{max}}$$

Thus $$(10) \quad T = \frac{.702l}{\pi A\omega \cos\frac{\pi}{l}z}$$

Thus, it is required that $\tau \leq T$, where T is given by (10), over a substantial range in "z."

The conditions for laminar flow are now given by (8) and (10). These conditions can always be met by suitable choice of $l$ and $\omega$.

The implication of the foregoing analysis is that by suitable choice of the liner material and the length "$l$" between supports, a laminar flow regime can be established with a reduction of pressure losses by at least a factor of 20.

In the foregoing mathematical presentation, an elastic liner supoprted at intervals was assumed. A continuous liner of this type would be more difficult to make vibrate in the desired controlled manner than the separate sections illustrated in the drawings, but may be considered within the broader aspects of the invention. It can be demonstrated mathematically that the separate sections, either flexible or rigid, will also prevent the establishment of turbulent flow when the frequency and amplitude of vibration are properly controlled.

From the foregoing description of the invention, it is apparent that unique methods of and apparatus for improving fluid flow efficiency are provided.

While preferred embodiments of the invention have been shown and described, it will be apparent to those skilled in the art that changes can be made in these embodiments without departing from the principles and spirit of the invention, the scope of which is defined in the appended claims. For example, the invention may be applied to certain parts of a fluid flow system, and not to others, but the invention is capable of producing substantial increases in over-all system efficiency (even taking into consideration the power consumed in producing the desired vibrations). Accordingly, the foregoing embodiments are to be considered illustrative, rather than restrictive of the invention, and those modifications which come within the meaning and range of equivalency of the claims are to be included therein.

As employed in the claims, the term "elastic waves" is used to describe waves which are generated by vibration of a fluid boundary in the manner set forth above and which are self-propagating in acocrdance with the physical laws of elastic wave vibration, including the relationship of vibration frequency, wavelength, and propagation velocity.

The invention claimed is:

1. The method of reducing turbulence in a fluid flowing through a flow conductor, comprising repetitively creating a force at the boundary of the fluid in opposition to the frictional force at the boundary during flow of the fluid by vibrating said boundary to generate elastic waves with amplitude displacements of the boundary in the direction of a cross-dimension of said flow conductor transverse to the flow direction, said amplitude displacements being very much smaller than said cross-dimension of said flow conductor, so as not to decrease substantially the effective cross-sectional area of said conductor, and being small compared to a half wavelength at the frequency of vibration, and controlling the frequency of vibration with respect to the period required for the fluid flow to change from a laminar state to a turbulent state so that insufficient time passes between successive creations of the force to permit the establishment of turbulent flow.

2. In a system in which fluid flows along a solid boundary of a conduit in a given flow direction and in which a drag force is exerted by said boundary upon said fluid in a direction opposite to said flow direction, the method of diminishing said drag force which comprises producing a force at said boundary in opposition to said drag force by vibrating said boundary to generate elastic waves with amplitude displacements of the boundary in the direction of a cross-dimension of said conduit transverse to said flow direction, said amplitude displacements being very much smaller than said cross-dimension of said conduit, so as not to decrease substantially the effective cross-sectional area of said conduit, and being small compared to a half wavelength at the frequency of vibration.

3. The method of claim 2, said boundary being vibrated by applying vibrational forces thereto from outside said fluid.

4. The method of claim 2, said boundary being vibrated by propagating a travelling wave along said boundary in the direction of fluid flow.

5. In a system in which fluid flows along a solid boundary in a given flow direction and in which a drag force is exerted by said boundary upon said fluid in a direction opposite to said flow direction, the method of diminishing said drag force which comprises producing a force at said boundary in opposition to said drag force by vibrating said boundary, said boundary being vibrated by applying pressure pulsations to said fluid and inducing vibrations in said boundary from said pulsations.

6. The method of reducing the drag force exerted upon the boundary of an object being propelled through a body of fluid, which comprises independently of the propulsion of said body generating an elastic self-propagating travelling wave along said boundary in the direction of fluid flow with respect to said boundary, the amplitude of said wave being very small compared to the half wavelength thereof.

7. The method of reducing the drag forces at the boundary of a flowing fluid, which comprises vibrating successive sections of said boundary along the path of fluid flow, each section being vibrated transversely of the flow direction with greater amplitude at the downstream end than at the upstream end, whereby forces are created at said boundary in opposition to said drag forces.

References Cited in the file of this patent

UNITED STATES PATENTS

| | | |
|---|---|---|
| 621,719 | Shann | Mar. 21, 1899 |
| 718,621 | Guenther | Jan. 20, 1903 |
| 873,539 | Guenther | Dec. 10, 1907 |
| 1,655,197 | Sauter | Jan. 3, 1928 |
| 2,261,558 | Orloff | Nov. 4, 1941 |
| 2,366,162 | Vang | Jan. 2, 1945 |
| 2,800,291 | Stephens | July 23, 1957 |
| 2,821,205 | Chilton | Jan. 28, 1958 |

FOREIGN PATENTS

| | | |
|---|---|---|
| 562,822 | Great Britain | July 18, 1944 |